April 20, 1954 W. M. BACON 2,676,199

TELEGRAPH SWITCHING SYSTEM

Filed Dec. 29, 1949 4 Sheets-Sheet 1

INVENTOR
W. M. BACON
BY R. C. Perry
ATTORNEY

April 20, 1954 W. M. BACON 2,676,199

TELEGRAPH SWITCHING SYSTEM

Filed Dec. 29, 1949 4 Sheets-Sheet 2

INVENTOR
W. M. BACON
BY R. C. Lerry
ATTORNEY

April 20, 1954 W. M. BACON 2,676,199

TELEGRAPH SWITCHING SYSTEM

Filed Dec. 29, 1949 4 Sheets-Sheet 3

INVENTOR
W.M. BACON
BY
R.C. Terry
ATTORNEY

April 20, 1954 W. M. BACON 2,676,199

TELEGRAPH SWITCHING SYSTEM

Filed Dec. 29, 1949 4 Sheets-Sheet 4

INVENTOR
W. M. BACON
BY R. C. Lerry
ATTORNEY

Patented Apr. 20, 1954 2,676,199

UNITED STATES PATENT OFFICE 2,676,199

TELEGRAPH SWITCHING SYSTEM

Walter M. Bacon, New York, N. Y., assignor to Bell Telephone Laboratories, Incorporated, New York, N. Y., a corporation of New York Application December 29, 1949, Serial No. 135,811

15 Claims. (Cl. 178—2)

This invention relates to a telegraphic transmission system; more particularly, to a transmission system for forwarding telegraphic messages to one of a plurality of discrete sub-receiving stations remotely located from a central receiving station.

The invention is applicable to telegraphic transmissions of the type automatically effected by perforated tape or other previously prepared recordings.

In telegraph communication systems, it is well known to provide transmitting and receiving stations employing perforating and printing equipment of the permutation code type. One such system, described in United States Patent No. 1,904,164 to Sterling Morton et al., granted April 18, 1933, employs at the transmitting end, a perforating machine which translates the letters or symbols to be transmitted to perforations in a paper tape. Start-stop transmitters are in turn operated by means of this perforated tape, transforming the code combinations of perforations in the tape into groups of electrical impulses. These impulses are transmitted via a transmission line to a receiving location, and are interpreted, and the letters or symbols represented by the received impulses are thereupon caused to be printed.

It is often desirable to retransmit the incoming signals arriving at a receiving station to a particular desired location remote from the receiving station. It is a particular object of the invention to provide means of forwarding such received signals to any one of a group of remotely located sub-receiving stations to which the message is ultimately to be transmitted. In summary, the invention will provide means of starting and stopping retransmitting equipment located at the central receiving station at the beginning and end respectively of each message; will forward a message to a chosen sub-receiving position when the particular line associated with the sub-receiving station is free; and will store such message in the event the line is busy until such time as it shall become free.

This specification will describe the central receiving station and the accompanying retransmission equipment to disperse the received intelligence to the aforesaid remotely located sub-receiving stations. However, the general operation of the original transmission station and the character of the signals transmitted should be understood for a complete understanding of the invention.

In start-stop automatic telegraph systems, the transmitters are customarily operated by perforated tape. At the source of the desired intelligence, an operator causes the tape to be perforated in groups of perforations which represent the letters or symbols to be transmitted. A sensing arrangement is provided which determines the number and arrangement of the perforations representing a given letter or symbol, and the information thus desired is supplied to a distributor system in the transmitter. This transmitter samples each of the aforementioned sensing pins to determine whether or not it senses a perforation. The intelligence found on the relative sensing pins is analyzed by the distributor with respect to time and in addition, the distributor ordinarily passes a sensing position which is used to synchronize a receiver remotely located. This system is well known and described in United States Patent No. 1,566,295 to Watson, granted October 17, 1922. In brief, the desired intelligence is caused to be transmitted in the form of electrical impulses over a transmission line to a receiver which can analyze the pulses and print the originally transmitted intelligence in a known manner.

The electrical impulses heretofore mentioned are known in the art of telegraphy by the terms "marking" and "spacing." These words identify two contrasting conditions of the line. Thus, in certain telegraphic systems, means are provided for causing current to flow in the line or for preventing the flow of current in the line at the transmitter. In such a system, the line may be said to be in a marking condition when current is flowing and a spacing condition when current is not flowing. It will be understood that in other types of systems, the terms "marking" and "spacing" may have slightly different meanings, as in telegraphic systems of the polarized type, in which two contrasting conditions to which the receiver is responsive, are the flow of current in the first direction and a flow of current in the reverse direction. The terms "marking" and "spacing" in the latter case will refer to the direction of the flow of current rather than the existence or absence of current.

The various incoming lines to the central receiving station will be referred to as the various "incoming levels," as distinguished from the various outgoing lines to the remotely located sub-receiving stations, which will be called the "outgoing loops."

The invention is more fully described in the following specification:

Figures 1, 5:
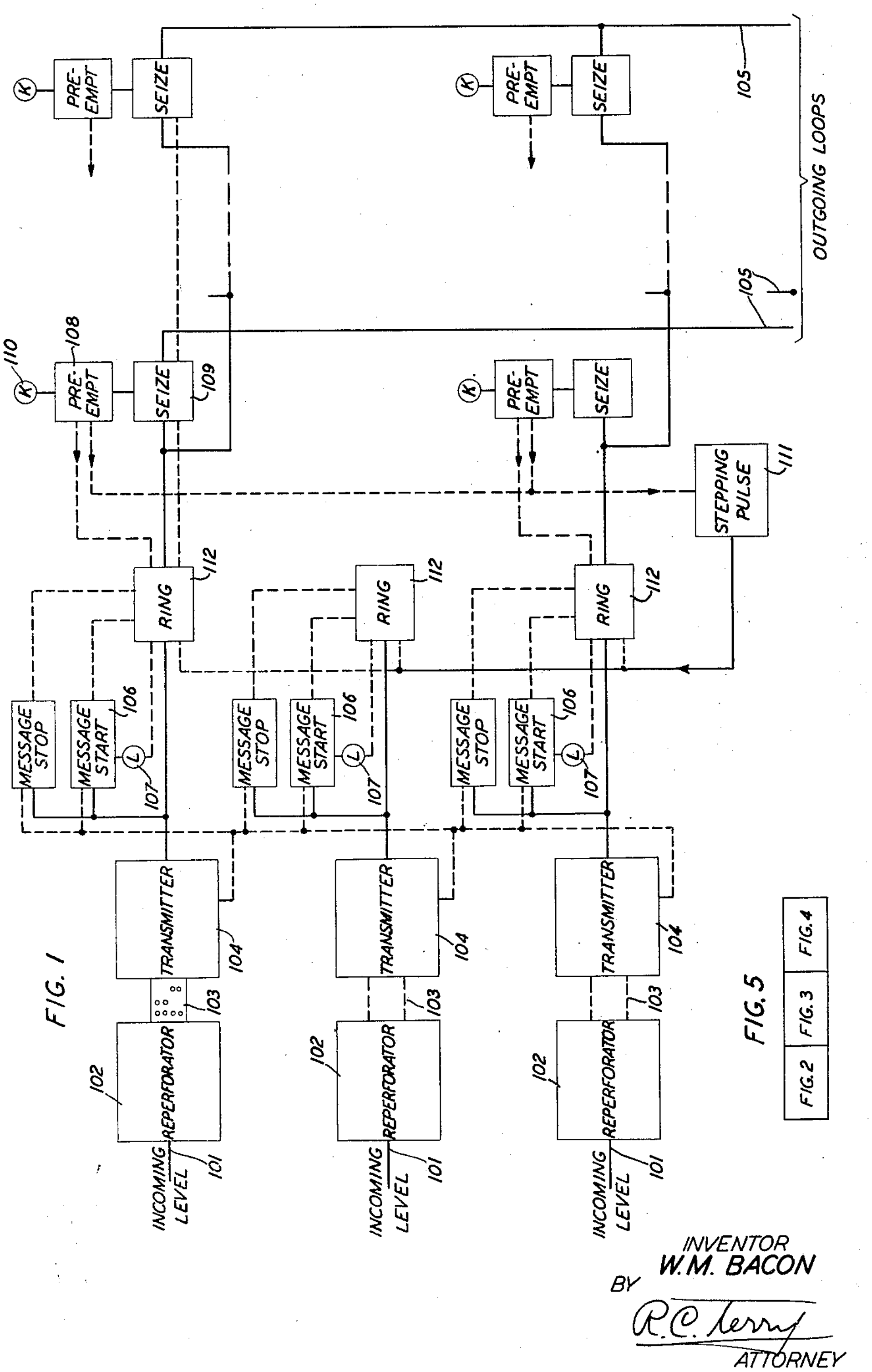
Fig. 1 shows a simplified block diagram to assist in explaining a system according to the invention.
Fig. 5 shows the interrelation of Figs. 2, 3 and 4.

Referring now to Fig. 1, the simplified diagram of the system according to the invention, it is to be noted that a number of incoming levels 101 are provided. Each of these incoming levels may have intelligence thereupon in the form of marking and spacing conditions. Each of the incoming intelligences are supplied to the "reperforator" 102 which produces a perforated tape 103. This tape has perforations which depend in number and arrangement along any given line normal to the direction of tape motion representative of the letters or symbols forming the desired intelligence, much in the manner of the original transmitting operation hereinbefore described. Such a reperforator is shown in United States Patent No. 2,255,794 to R. A. Lake, granted September 16, 1949. This reperforator operates as described and in addition, will simultaneously provide a printed interpretation of the perforations made. This will be later shown useful in determining the sub-receiving position addressed. While three incoming levels are shown, it is within the scope of the invention to provide any number of incoming levels.

The tapes supplied from the reperforators are delivered to the respective transmitters 104. Each of the transmitters 104 interprets the perforations made by the associated reperforator to provide groups of electrical marking and spacing pulses representative of the intelligence to be transmitted. Any number of outgoing loops 105 extend from the central receiving station shown generally in Fig. 1 to remotely located receiving stations, not shown. When a predetermined code symbol is sensed by one of the transmitters, this code symbol activates the associated "message start" circuit 106. The message start circuit causes the associated lamp "L" 107 to light and indicate to the operator at the central receiving position that a message is being received for retransmission to one of the remotely located sub-receiving stations. Further, the associated central receiving station transmitter 104 stops, and the tape containing the received message accumulates. The operator will then determine, by an inspection of the tape or other means, to which of the remote sub-receiving stations the message is to be forwarded.

Each of the outgoing loops 105 to the sub-receiving stations has associated therewith a so-called "preempt" and "seizing" circuit for each of the incoming levels; thus, for twelve outgoing loops representing twelve remotely located sub-receiving stations and three incoming levels, thirty-six "preempting" and "seizing" circuits must be provided. For example, the upper incoming level and furthest left-hand outgoing loop will be associated in common with preempt circuit 108 and seize circuit 109. The apparatus of the "preempting" and "seizing" circuits will be later described.

When the operator has determined which of the sub-receiving stations is to receive the message as previously indicated, it will be necessary to operate a key shown as "K" associated with the "preempt" circuit common to the incoming level through which the message is being received and the outgoing loop associated with the particular sub-receiving station to which the message is addressed. Thus, to attempt connection between the upper incoming level and left-hand outgoing loop, the key 110 must be operated. Operation of the appropriate key "K" will at once extinguish the lamp, indicating that a message is waiting, and will connect the appropriate incoming level to the appropriate outgoing loop through the seizing circuit and the "ring" circuit, later to be described, if the outgoing loop is at that time free.

Operation of the "K" key will produce a preparatory condition in the various circuits of the invention; the "stepping pulse" circuit 111 will be set into operation. The stepping pulse circuit drives a group of relays to be found in the various blocks marked "ring" 112. The function of the ring relays is to offer a connection of each of the receiving levels to the seize relay associated with a "K" key previously operated. If the outgoing loop associated with the operated "K" key is at that time busy, the stepping pulse arrangement will continue in operation and the ring relays will offer connections between each of the various levels of incoming lines to all the outgoing loops in rapid succession. As long as any "K" key has established a preparatory condition which remains unsatisfied, e. g., because of a busy circuit, the stepping pulses will continue and the relay rings will also continue to offer connections as stated. When all the waiting incoming levels have been satisfied and have been connected to the appropriate outgoing loops, the stepping pulse circuit and the ring of relays will stop until another preparatory condition is established.

When an operating condition is achieved, that is, when the desired intelligence is supplied from the incoming level to the appropriate outgoing line through the seize relay, the seize circuit will start the transmitter in operation which in turn causes the accumulating tape to be fed to the transmitter; the message will be retransmitted to the remote sub-receiving location. There follows a more detailed description of a preferred embodiment of the invention.

*Reperforator and transmitter*

Figure 2:
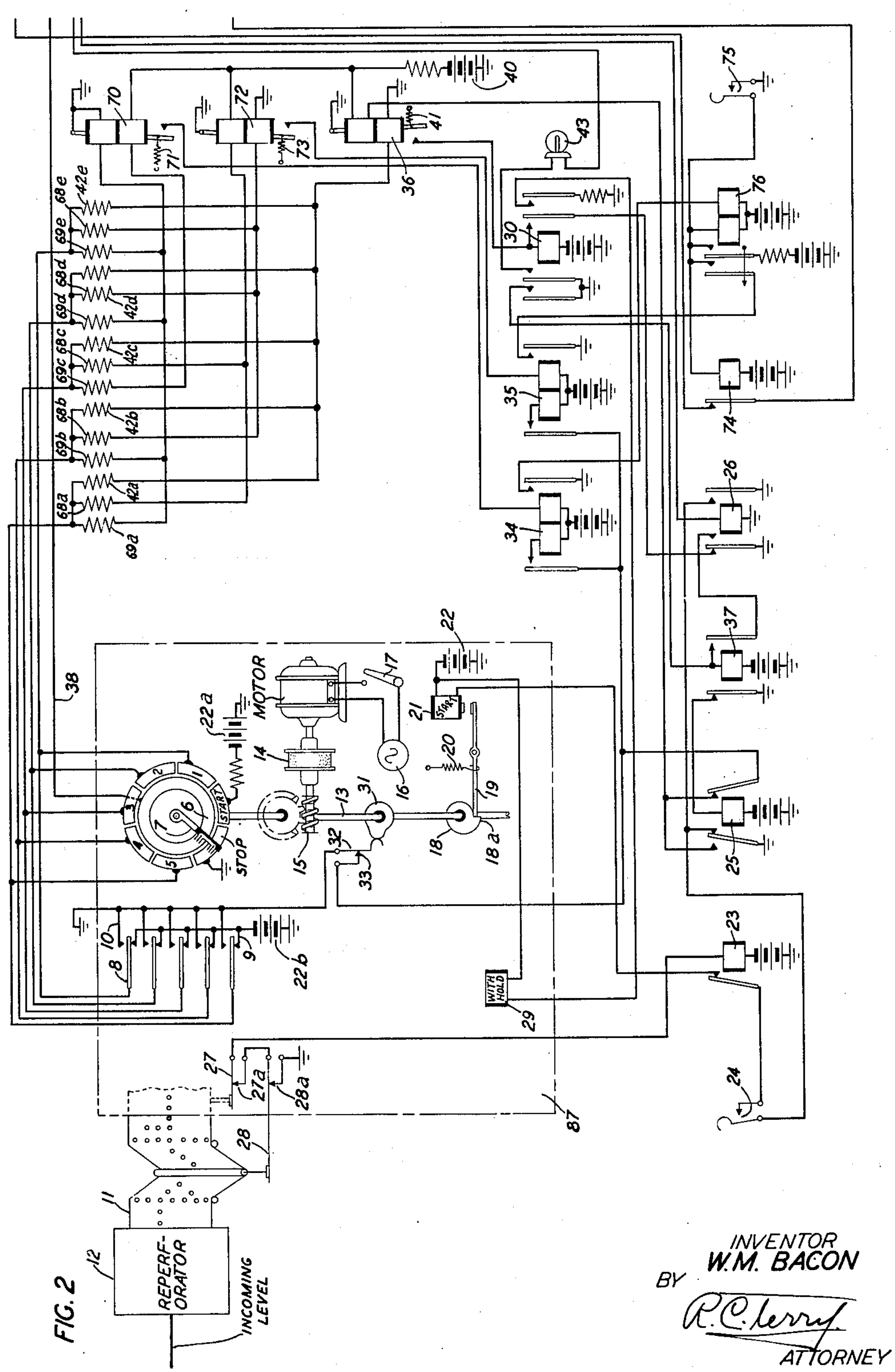
Figs. 2, 3 and 4 show a preferred embodiment of the invention, indicating the schematic circuits employed at the central receiving stations.

The incoming intelligence received on the various incoming levels is received by a reperforator, as previously indicated. Referring now to Fig. 2, only one incoming level is shown in detail. This level is supplied with a reperforator 12, which produces a message tape 11. The tape is in turn delivered to a transmitter 87, shown in the dotted enclosure. The reperforator and transmitter form the first of the circuits providing for the retransmission of the signals to the appropriate remotely located sub-receiving station.

Tape transmitters are heretofore known. Such tape transmitters receive perforated tape, which in this instance has been prepared by the reperforator, and depending upon the positions of combinations of perforated and unperforated areas in the tape, the tape transmitter will transmit to its line output various code combinations. The code combinations normally include a start pulse, which may be a spacing pulse, and five code pulses which may be various combinations of marking or spacing pulses depending on the perforations of the tape, and a stop pulse which may be a marking pulse.

As shown in Fig. 2, the tape transmitter 87 includes a distributor having a solid inner distributing ring 6 and a segmented outer distributing ring, both of which are suitably attached to the upper surface of an insulating disc, not shown. The outer distributing ring is divided into seven segments insulated one from another, which include a stop segment, a start segment, and five code pulse segments numbered 1 through 5 in the drawing. The distributor brush arm 7 continuously engages the inner ring 6 and successively engages segments of the outer ring with a wiping movement. Connected to the respective segments 1 through 5 are a group of five contact armatures such as 8. There are provided five lower contacts such as 9 and five upper contacts such as 10 for each of the contact armatures such as 8. In order to sense the perforations in the tape 11, which is fed to the transmitter from the reperforator 12, there are provided five sensing pins, one for each of the five contact armatures as 8, and mechanical linkages extend from each sensing pin to its associated contact armature for controlling the armature position. Sensing pins and contact armatures of the type described are fully disclosed in United States Patent No. 2,055,057 to E. F. Watson, granted September 29, 1936, to which reference is made for more complete detail. The contact armatures such as 8 in Fig. 2 of the present application may be considered to represent schematically the entire means for sensing the perforations of the tape and which make contact between the various leads to the respective contact armatures as 8 and upper or lower contact sets as 9 and 10 in response to the code perforations.

The arrangement is such that when a sensing pin engages a hole in the tape, the armature, for example 8, controlled by its associated sensing pin engages the appropriate upper contact 10. This will be shown to provide a marking condition in the lead running from the armature sensing a perforation. The tape 11 is provided with a series of feed holes arranged approximately along the center line of the tape by which it is intermittently advanced through a mechanism linked to the distributor shaft 13. The distributor brush arm 7 is carried by shaft 13 which is in turn driven by a motor through friction clutch 14 and worm gear drive 15. The motor is supplied with current from a source 16 through a manually operable control switch 17.

Synchronization is achieved between the central receiving station transmitter and the associated start-stop sub-receiving station receiver by impulses transmitted from the stop and start segments of the outer ring of the distributor shown in 87. The stop segment of the outer ring of the distributor is connected to ground and the start segment is connected to a battery 22–*a* providing, in this case, the necessary electrical impulses.

In normal operation of the transmitter, a difference may frequently occur between the rate at which the transmitter operates and that at which the tape 11 may be supplied from the reperforator 12 to the transmitter 87. As has previously been indicated, various control circuits according to the invention may cause one or more of the transmitters to stop entirely until certain functions have been performed. When this occurs, the reperforator associated with the stopped transmitter will ordinarily maintain its tape output and the tape will be stored between the reperforator and the transmitter until the transmitter is again started. It may also be seen that when the reperforator operation is interrupted or stopped at the end of a message, the transmitter may ultimately use up all the slack in the tape and proceed to damage the tape feed holes unless provision were made to stop the transmitter automatically.

To understand the means for taking care of the difference between the rates of operation of the transmitter and the reperforator, the general operation of the distributor shaft system must be understood. There is fixedly mounted on the main drive shaft 13, a stop cam 18 formed with a peripheral shoulder 18–*a*. Associated with the stop cam is a pivoted stop arm 19. One end of the arm 19 is urged to engage the periphery of the stop cam by a spring 20. The opposite end of the stop arm 19 is magnetically associated with an electromagnet 21 known as the "start magnet." Electromagnet 21 is employed to move the stop arm 19 about its pivot, that it may be moved out of engagement with the stop cam periphery when the distributor is to rotate. Electromagnet 21 is connected electrically in series with a battery 22, with the made contact of relay 23, through the contacts of a stop lever 24, and thence through the made left-hand contact of relay 25 to ground and to the right-hand contact of relay 26. Relay 23 and stop arm 24 are adapted to open the series circuit to the start magnet 21 independently, and either relay 25 or 26 may open the series circuit intradependently. The winding of relay 23 is in series with the battery, with "tape-out" stop arm 27 and its associated contact 27–*a*, and with a "slack tape" arm 28 and its associated contact 28–*a*, to ground. When there is a normal amount of slack tape 11, the slack tape arm 28 engages the contact 28–*a*. When a taut tape condition exists, contact 28–*a* and arm 28 will be opened, releasing the start magnet 21 and stopping the distributor from its rotation. If the reperforator should run out of tape, tape-out stop 27 will break with its associated contact 27–*a*, releasing the start magnet 21 and stopping the transmitter.

Before the tape transmitter is turned on for transmitting messages, both the manually operable motor switch 17 and the manually operable transmitter stop switch 24 must be closed. In starting up the transmitter, the switch 17 is first closed and the motor will rotate. Arm 19 will prevent rotation of the distributor shaft 13; and the friction clutch 14 allows rotation of the motor shaft despite the fact that the shaft 13 and worm drive 15 are stationary. When, as the next step, the manually operable switch 24 is closed, current from the battery 22 energizes the start magnet 21 which attracts the right-hand end of arm 19, causing this arm to pivot in a counter-clockwise direction, thereby releasing the stop cam 18. The distributor will then rotate. At any time that the start magnet 21 is deenergized, the arm 19 engages the shoulder 18–*a*, preventing the rotation of the distributor. In the latter case, the motor may still continue to rotate because it is coupled to the transmitter through the friction clutch 14.

A tape feed withhold magnet 29 is so coupled to the tape feed mechanism that its operation will prevent the feeding of tape to the transmitter although the distributor shaft 13 is rotating. Such a tape feed withhold magnet arrangement is shown in United States Patent No. 2,381,871, granted August 14, 1945 to myself and others. Withhold magnet 29 is in series with the battery 22 and the open, outer right-hand contact of relay 30.

Distributor shaft 13 has an additional cam 31 which rotates with it. Upon each rotation of the distributor shaft, engaged with arm 19, a shoulder of cam 31 closes auxiliary contact 33 with armature 32. Auxiliary contact armature 32 is connected to ground and makes to its associated contact 33 and thence to the made right-hand armature and contact of relay 25, shown in operated position, and to the left-hand armatures of relays 34 and 35.

Figure 3:
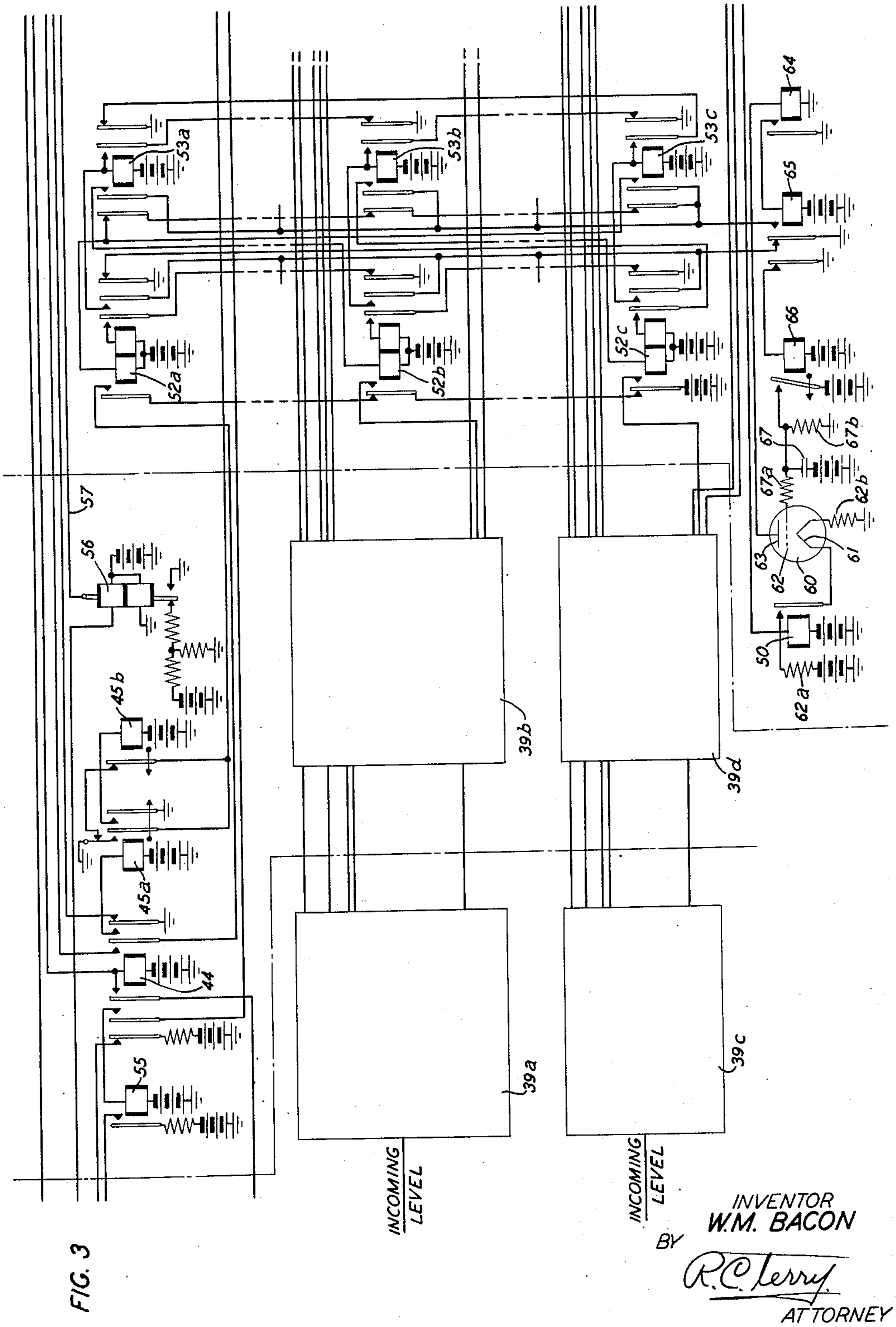

Referring to Fig. 3, blocks 39–*a* and 39–*c* represent circuits as shown in Fig. 2 for two diverse incoming levels. Blocks 39–*b* and 39–*d* represent relays and circuits, similar to those shown in Fig. 3 on the left-hand side of the dotted division, for these two incoming levels.

*Starting of message*

It has been stated that a predetermined letter or symbol sent in the form of intelligence over the incoming line will activate the operation of the circuit according to the invention. It may be assumed that some printing telegraph code signal such as the code signal indicating the presentation of the printing mechanism in the lower case condition may be the signal utilized as a starting point for the message. One standard printing telegraph code utilizes five perforations, one for each of the sensing pins, to indicate this lower case symbol and is known in the art as the "Letters" symbol. The perforation code for "Letters" may be indicated by the code group MMMMM where M is equivalent to a marking condition on the line. Relay 36 is a balanced polarized relay. When the system is in normal operation, relay 25 will be operated as shown; the winding of relay 25 is connected in series with battery and to the closed left-hand contact and armature of relay 37 to ground. In turn, the upper winding of relay 36 is connected in series with the made right-hand armature and contact of relay 25 and through auxiliary contact 33 to ground. Assuming that the distributor is at rest, the auxiliary contact and armatures 33 and 32 would be closed to ground as previously described. The free side of the upper winding of relay 36 is connected to battery 40. The polarization of this upper winding is such as to aid a bias spring 41 holding the armature of relay 36 in an open or right-hand position. When the transmitter is started through the closing switch arm 24 and "Letters" character is sent, the sensing armatures such as 8 will all make with the respective upper contacts 10 and thence to ground. The five leads from the various armatures as 8 connect not only to the respective outer distributor ring segments 1 through 5 as previously described, but also through resistances 42–*a*, 42–*b*, 42–*c*, 42–*d* and 42–*e* to a common line connected to the lower winding of relay 36, the latter having the other terminal of its winding connected to ground. Thus, it may be seen that reception of the "Letters" character will place ground on either side of the lower winding of relay 36. When any character other than "Letters" is received by the transmitter, at least one of the armatures corresponding to 8 will be connected to the respective lower contacts corresponding to 9 and therefore to battery 22–*b*. This follows inasmuch as "Letters" is the one character represented by five simultaneous perforations and any other character will cause one of the armatures to be connected to battery instead of ground. Thus, current will flow through those of the armatures 8 that are sensing no perforations, through the associated resistances 42 and to the lower winding of relay 36, closing relay 36 to its left-hand contact.

The operation of relay 36 upon the reception of a character other than "Letters" will close a path through the armature and contact of relay 36, putting ground upon one end of the winding of relay 30, the other end of the winding being connected to battery. Thus, the actuation of relay 36 operates relay 30. Relay 30 will lock operated, by virtue of ground presented to its winding through its inner right-hand contact and armature, thence through the closed left-hand contact and armature of relay 26 to ground. Among the functions achieved by operation and locking relay 30 include: placing ground on one side of lamp 43 known as the "Message Ready" lamp, through the inner left-hand contact and armature of relay 30 to ground; operating the tape feed withhold magnet 29 through the outer right-hand contact and armature to ground, placing ground on the tape feed withhold magnet 29, otherwise connected to battery, as described; and in addition, relay 37 will be operated as battery connects to one side of the winding of relay 37, the free side connecting to the outer left-hand contact of relay 30 to ground when 30 is operated.

Relay 37 will remain operated as long as relay 30 is operated. Operation of relay 37 interrupts the current in the winding of relay 25, allowing it to release. The release of relay 25 removes ground from the start magnet 21 as indicated in the Transmitter description and the distributor will stop rotating.

To summarize, the operation of relay 30 will prevent the feeding of tape to the transmitter as previously described through operation of the tape feed withhold magnet 29, and the subsequent release of relay 25 will stop the rotation of the distributor. This is the normal condition when a message is ready and the operator is to select the appropriate sub-receiving station to which the message is destined. The operator will receive notification that a message is to be transmitted by the lighting of lamp 43, one terminal of which is connected to ground through relay 30 as previously described, and the other terminal of which is connected through the outer left-hand back contact and armature of relay 44 in Fig. 3, to battery, illuminating lamp 43. Notified, the operator will examine the tape being produced by the reperforator. Although the distributor has stopped rotation, and the tape feed withhold magnet 29 is operated, the reperforator will continue to perforate in the tape the message, including the destination thereof.

*Message transmission and distribution*

Figure 4:
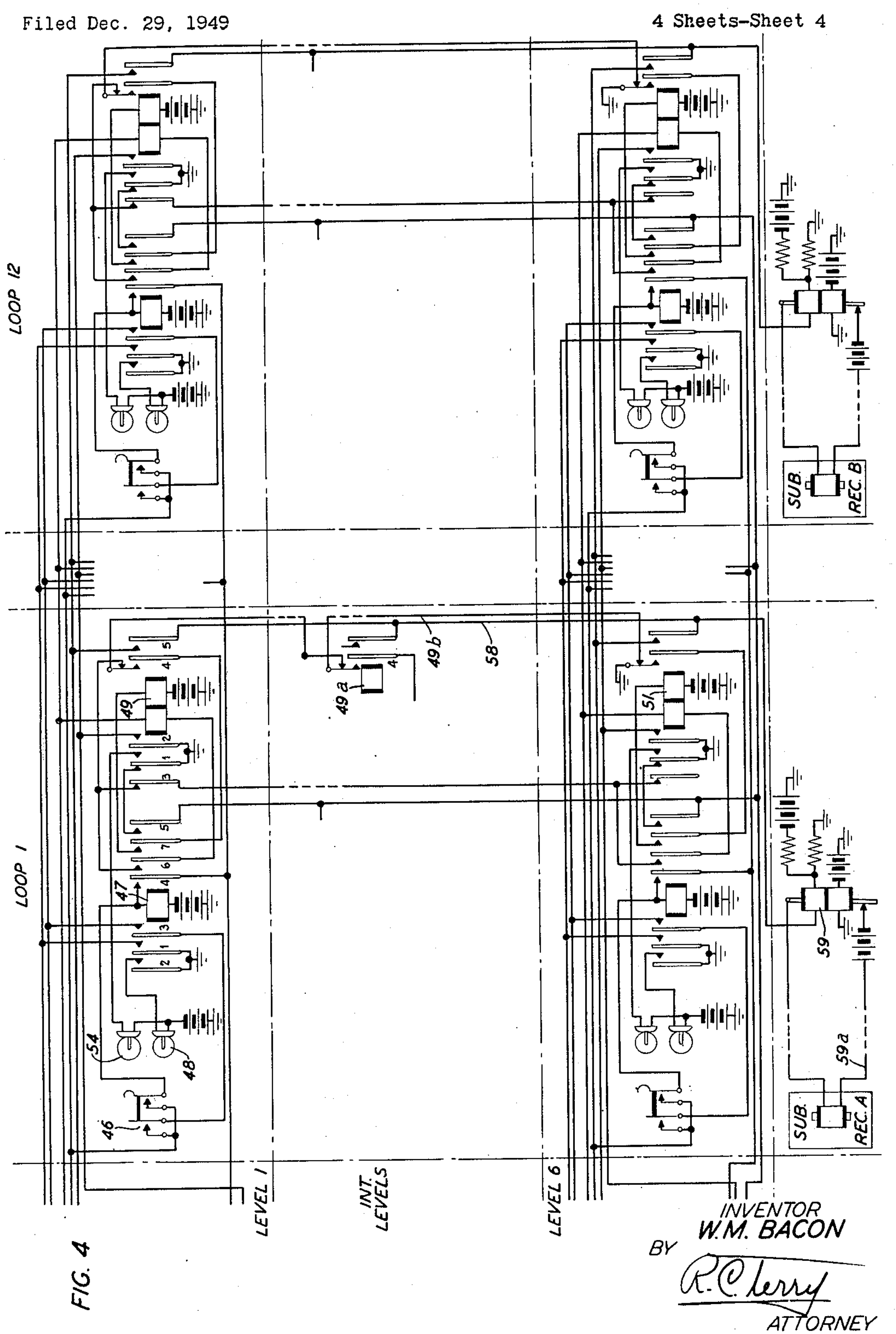

The operator has been informed by the message tape of the identity of the sub-receiving station to receive the incoming message. Each of the remotely located sub-receiving stations is connected to a particular outgoing loop. Arrangements must be made to connect any one of the outgoing loops to any one of the incoming levels. This will be accomplished by a "seize" relay which is located in an appropriate position with respect to the outgoing loop and the incoming levels, and each outgoing loop must have a seize relay associated with each level to which it is to be connected. With each of the seize relays, there will be associated a preempt relay and an operating key, whose general functions were described in the simplified diagram, Fig. 1. Assuming that the prior description of the start of a message appertains to incoming level 1 indicated in Figs. 2, 3 and 4, the message ready lamp 43 in Fig. 2 will have been illuminated. For descriptive purposes, it may be assumed that the operator has determined that the message is addressed to the sub-receiving station connected to outgoing loop 1. The appropriate seize and preempt relays and operating keys associated both with outgoing loop 1 and incoming level 1 are shown in the upper left-hand corner of Fig. 4. Thus, the operator will momentarily operate key 46. Operation of key 46 will complete the circuit of "preempt" relay 47 shown in Fig. 4. Operating current is supplied to the winding of relay 47 from battery on one side, through operated key 46, the outer right-hand contact and armature of unoperated relay 44 in Fig. 3, to ground.

Operation of preempt relay 47 produces a group of simultaneous occurrences. When key 46 operates relay 47, the ground path previously described from the outer right-hand contact of relay 44 extends not only through the left-hand armature and contact of key 46 to the coil of relay 47, but in addition, through the left-hand contacts and armature of key 46 to the No. 3 armature of relay 47. When relay 47 operates, its No. 3 armature closes against its associated contact and provides ground to the winding of relay 44, connected on its opposite terminal to a battery, causing relay 44 to operate. The operations effected by relay 44 will be fully described at a later point. In the meantime, the No. 4 armature of relay 47 has provided a locking path for relay 47. This locking path exists at first through the armature and contacts of relay 45–*b*, the closed "make-before-break" contacts of relay 45–*a* to ground, when both relays 45–*a* and 45–*b* are non-operated. Operation of relay 44 will operate relay 45–*a* through the now closed outer right-hand armature and contact, putting ground on the winding of relay 45–*b* connected on its opposite terminal to battery. The continuity of ground provided to No. 4 contact of relay 47, locking relay 47, will remain uninterrupted upon operation of relay 45–*a* because the inner right-hand armature and contact of 45–*a* will connect ground to armature No. 4 of relay 47 before breaking the ground connection through the contact and armature of 45–*b* and the make-before-break contact of relay 45–*a* to armature 4 of relay 47. Operation of relay 45–*a* will in turn complete the circuit of the winding of relay 45–*b*, through its outer right-hand contact and armature connected to ground and to one terminal of the winding of relay 45–*b*, the other terminal of which is connected to the battery. As indicated previously, however, the operation of relay 45–*b* has no effect as the conductor connected to the armature of 45–*b* has already been connected to ground through the inner right-hand contact of relay 45–*a*.

Relay 44 is operated and locked when key 46 is operated, as previously indicated. This is achieved through ground connected to the outer right-hand armature and contact of relay 44 in Fig. 3, to the left-hand contact and armature of operating key 46, to the armature and contact 3 of relay 47, to the winding of relay 44 which has its other terminal connected to a battery. During the moment of time the operating key 46 is closed, ground will be held on the winding of relay 44 through the previously described lock circuit of No. 4 contact of relay 47, to the No. 4 armature and contact of relay 47, to the right-hand armature and contact of key 46, to the left-hand armature and contact of key 46, to the No. 3 armature and contact of relay 47, and to the winding of relay 44 as previously described. A locking path is provided for relay 44 from ground to No. 1 armature and contact of relay 47, to the closed contact and armature of relay 74 of Fig. 2, to the inner left-hand contact of relay 44, locked closed, to the winding of relay 44, which has its other terminal connected to battery. Operation of relay 74 or release of relay 47 will therefore unlock relay 44.

Returning to the effect of the operation of relay 47, it has been seen that relay 44 is operated through contact 3 and that relay 47 is locked through contact 4 and relays 45–*a* and 45–*b*. In addition, ground will be extended to one terminal of lamp 48, the other terminal of which is connected to battery; lamp 48 will thereupon be illuminated, indicating to the operator that preempt relay 47 is operated and that a preparatory condition is being established. In fact, this preparatory condition is being established through contacts 5, 6 and 7 of relay 47. Closing of contact 5 provides a path from ground to the No. 1 armature and contact of relay 49 through the closed No. 1 armature and contact of relay 49 to the closed No. 5 contact and armature of relay 47 now operated, to one terminal of relay 50, shown on Fig. 3, which has its other terminal connected to battery. It will later be shown that relay 50 establishes that part of the preparatory condition operating the stepping pulse circuits.

The seize relay 49 has two energizing windings. The left-hand winding is connected to the No. 6 armature and contact of relay 47 and thence in series with and through its own No. 4 make-before-break contact and to ground through a series connection of each of the No. 4 make-before-break contacts of all the seize relays corresponding to relay 49 in loop 1, indicated, for example, as 49–*a*, to the make-before-break contact on the inner right-hand contact of relay 51 and to ground. Thus, only if no seize relay is operated in loop 1, will ground be established on one side of the left-hand winding of seize relay 49 when relay 47 operates. The free side of the left-hand winding of relay 49 connects to the inner right-hand contact of armature 44. Assuming that relay 44 is operated and locked, the inner right-hand contact and armature connects to the armature and contact of relay 52–*a*. It will be seen that relay 52–*a* intermittently provides a path to battery for the left-hand winding of relay 49 in accordance with a predetermined arrangement offering such a battery connection momentarily to each of the incoming levels in sequence. It may be assumed, for the purpose of discussion, that battery is momentarily provided to the inner right-hand armature and contact of operated relay 44, and thence to the free left-hand winding of relay 49. Provided that no other seize relay is operated in loop 1, relay 49 will operate. If one of the other seize relays corresponding to relay 49 in loop 1 should be operated, the operated relay will have an open No. 4 make-before-break contact as at 49–*a*; a busy condition of loop 1 results, and seize relay 49 will not operate. Assuming now that loop 1 is not otherwise busy, the seize relay 49 will lock through its right-hand winding as follows: the right-hand winding is connected to battery on one side. The free side of the right-hand winding is connected to No. 7 armature and contact of relay 47, now operated. No. 7 contact of relay 47 in turn passes back to No. 4 armature and contact of relay 49 and passes thence to ground, through the No. 4 make-before-break contacts of the relays corresponding to 49–a in loop 1. Assuming that relay 49 has at least momentarily operated, passage of current through relay 47, contact No. 7 and relay 49, contact No. 4 will lock relay 49 in a closed position.

It has been seen that operation of relay 47, the preempt relay, will operate and lock the seize relay 49 if no other seize relay in the chosen loop is operative. Operation of the seize relay 49 procures other results.

Operation of the seize relay provides a ground circuit through armature and contact 1 of relay 49, the seize relay, to one side of lamp 54, which will be illuminated, being otherwise connected to the battery. This lamp indicates to the operator that the incoming message is being properly retransmitted to the selected outgoing loop. Further, closing of the No. 2 armature and contact of relay 49 provides a ground path through the center left-hand armature and contact of relay 44, now operated, to one terminal of the winding of relay 55 in Fig. 3, which has its other terminal connected to battery.

Relay 55 provides a battery path through its armature and contact to relay 26 in Fig. 2, previously mentioned. Operation of relay 26, in turn, unlocks relay 30 by removing the ground from the inner right-hand contact and armature previously locking relay 30, and the left-hand armature will now make to its associated contact providing a lock path to the right-hand armature and contact of relay 37. In addition, a ground path is provided through the right-hand armature and contact of relay 37. In addition, a ground path is provided through the right-hand armature and contact of relay 26 to the stop lever arm and contact 24, through the armature and contact of relay 23 in a path previously described to the start magnet 21, ultimately releasing the distributor shaft 13, and allowing the distributor to rotate; the message will now proceed.

In the foregoing, it has been noted that operation of the seize relay 49 unlocks relay 30. Unlocking of relay 30 will extinguish the "Message Ready" lamp 43 by removing the ground from one side of the lamp. The tape feed withhold magnet 29 will also be released by removing the ground path previously described through the outer right-hand contact of relay 30. Thus, the transmitter will be started and the tape will feed. The most important operation performed by seize relay 49, however, is to connect the transmitter output signal to the appropriate outgoing loop. The output of the distributor is provided on a path originating at the inner commutator ring 6 of the distributor shown in Fig. 2. The signals pass over conductor 38 in Fig. 2, to the upper winding of relay 56. The signal will be impressed on the upper winding of relay 56 and cause it to operate in accordance with the marking and spacing pulses by passing the armature from the left-hand contact to the right-hand contact in the transition from mark to space. The lower winding of relay 56 is a bias winding, permitting adjustment of relay sensitivity. This bias winding tends of hold relay 56 in a spacing or right-hand condition, and will be overcome by the marking signals sent by the distributor. A marking condition causes relay 56 to stay on the left-hand contact, placing battery on lead 57. A spacing condition on lead 38 operates relay 56 to the right-hand contact with the bias winding alone energized, and places ground on lead 57. Thus, lead 57 will now transmit battery for marking and ground for spacing representative of the signal intelligence and the synchronization.

Lead 57 extends to the No. 5 contact and armature of seize relay 49. It has been stated that the operation of relay 49 connects the appropriate incoming level to the desired outgoing loop and it is this connection that is made at No. 5 contact and armature of relay 49. The signal passes from line 57 to line 58 through this contact and armature and ultimately to the upper winding of transmitting relay 59. Relay 59 has a lower bias winding tending to maintain the armature in a left-hand position. Upon reception of the spacing signal on line 58, relay 59 operates to its right-hand position, opening the outgoing loop circuit. With a marking signal, the bias winding alone will be energized, closing relay 59 to the left-hand contact.

When none of the seize relays is operated, the bias winding will hold relay 59 to the left-hand or marking condition.

*Busy condition—stepping pulse generation*

It has been seen that if any of the seize relays on a desired outgoing loop is operated, it is impossible to operate any other seize relay associated with that loop. The invention provides a means whereby the message received on any incoming level will be withheld and stored until the desired outgoing loop is free.

Let it be assumed that the operator has performed all the functions previously indicated up to the point of closing the appropriate operating key, 46 for example, thereby operating relay 47 as previously described, and setting up the preparatory condition. It has been seen that establishment of the preparatory condition extinguishes the "Message Ready" lamp 43 and operates relay 50. In general, the operation of relay 50 sets in motion the operation of the stepping pulse circuits. It will be the duty of the stepping pulse and ring circuits to offer a connection of each of the incoming levels to each of the outgoing loops, when a connection is desired as a result of establishment of the preparatory condition.

The immediate function of relay 50 upon operating as a result of the establishment of a preparatory condition is to provide a battery connection through its contact and armature to the filament of the thermionic discharge tube 60. Reflecting upon the polarity of the system described, it will be found that ground is assumed to be at positive potential and that battery connections are made on the negative side to the individual circuits. One end of filament 61 is connected in potential at a point located between the positive and negative ends of the battery depending on the relative value of resistances 62–a and 62–b. In any event, filament 61 will be at an absolute potential level somewhere between the positive or negative potential level. The anode 63 of thermionic discharge tube 60 is connected through relay 64 to ground and therefore to the point of most positive potential. Control grid 62 will be shown to have a positive voltage thereon, allowing a flow of electrons from cathode 61 to anode 63; current will thereupon be caused to flow in the windings of relay 64. This current is sufficient to operate relay 64.

Operation of relay 64 will provide a ground path through its armature and contact to one terminal of the winding of relay 65, the other terminal of which is connected to a battery, to operate relay 65. Operation of relay 65 will open the ground path provided through its outer armature and contact and the winding of relay 66 to battery. Because of the normally made outer contact and armature of relay 65 previously described, relay 66 will ordinarily be in an operated condition until relay 65 is operated. Relay 66 is of the slow release type; a dashpot or other means coupled to the armature provides a measurable time delay until the releasing motion is completed and the armature closes upon its back contact.

Before the operation of relays 64 and 65 and the subsequent release of relay 66, the grid 62 of the thermionic discharge tube will have applied to it a voltage positive with respect to the cathode, permitting the previously described flow of current from the filament to the anode. This positive voltage is developed through resistances 67–*a* and 67–*b* to the positive ground. The subsequent release of relay 66 places negative battery voltage upon the grid 62 through the contact and armature of relay 66. Until the release of relay 66, negative battery cannot reach the grid, being blocked by condenser 67. When the grid 62 becomes negative, the flow of current from the filament to the anode will cease or become materially reduced. This elimination or reduction of current flowing from the filament to the anode will allow relay 64 to release, in turn releasing relay 65. This will reenergize relay 66, restoring the positive voltage to the grid 62 of the thermionic discharge tube, and again allowing anode current to flow. The filament to anode current of the thermionic discharge tube will be alternately permitted and suppressed; the associated relays 64, 65 and 66 will repetitively operate and release depending principally on the time lapse interposed by the slow release of the armature of relay 66. The combination of elements comprising tube 60 and relays 64, 65 and 66 is a form of oscillator. It has been found desirable for the purpose of this invention to adjust the release time of the slow release relay to produce oscillations of the order of sixty per minute of the filament to anode current.

The inner armature of relay 65 will also be operated and released upon the operation of relay 65 and will therefore connect ground to first the left-hand contact and then the right-hand contact associated with the inner armature. It is this reversal from one contact to another which provides the stepping pulse desired. It can be seen that this stepping pulse has a rate controlled by the interruption frequency of the thermionic discharge tube 60 in the manner previously described. In net, the operation of the preempt relay 47 and consequent establishment of the preparatory condition provides, inter alia, the stepping pulses to be found at the inner contact of relay 65.

*Busy condition—relay ring*

A ring of relays is indicated in Fig. 3. These relays are shown as composed of ring gate relays 52–*a*, 52–*b* and 52–*c* for each incoming level, and associated ring control relays 53–*a*, 53–*b* and 53–*c*. Corresponding ring gate relays and ring control relays will be required for each incoming level.

Assuming that the system is being operated for the first time, the ring will first be energized as follows: upon the first operation of relay 65, a ground path is provided on the inner armature and the made contact of relay 65. This ground path continues from the aforementioned contact to the made outer left-hand armature and contact of non-operated relay 53–*c*, and to the made outer left-hand contact of non-operated relay 53–*b*, and finally to the made outer left-hand contact of non-operated relay 53–*a*. The outer left-hand contact of relay 53–*a* provides a ground to the left-hand winding of relay 52–*a* otherwise connected to battery. This will cause relay 52–*a* to operate, as energization of either winding of relay 52–*a* will operate it.

Relay 52–*a* will lock through its inner right-hand contact and armature to the outer right-hand contact and armature of relay 52–*b*, made when 52–*b* is released, to ground. This will provide a ground connection on one terminal of the right-hand winding of relay 52–*a*, the other terminal of which is connected to the battery, locking 52–*a* closed irrespective of relay 53–*a*. A primary object in operating relay 52–*a* is to close its left-hand make contacts. This left-hand armature and contact connects through the made left-hand contacts and armatures of relays 52–*b* and 52–*c* to battery, providing a battery to the inner right-hand armature and contact of relay 44 which may be locked operated as stated in the previous description. If relay 44 is operated, battery potential travels from the inner right-hand contact of relay 44 to the left-hand winding of seize relay 49 in Fig. 4 which has its opposite terminal connected through the closed No. 6 contact of the preempt relay No. 47 through the path previously described. The seize relay 49 will operate in accordance with the prior description of its operation, provided no other seize relay in that outgoing loop is operated. If line 49–*b* has an open make-before-break contact, located in one of the relays corresponding to 49–*a* or 51, seize relay 49 cannot operate; a moment of time later the stepping pulse circuits will seek another level. It can be seen that the initial pulse of relay 65 and subsequent operation of relay 52–*a* will, in net, offer a connection between the incoming level 1 and outgoing level 1. An examination of Fig. 4 will disclose that operation of relay 52–*a* offers a connection from level 1 to all of the outgoing loops; a battery connection is made to the left-hand winding of each of the seize relays. If the associated preempt relay of any of these seize relays is operated, a connection will be attempted, dependent on whether another seize relay in the same outgoing loop is operated.

Assuming that the desired outgoing loop indicates a busy condition, the relay 65 will release after a predetermined period of time dependent upon the stepping pulse period, and its inner left-hand armature will return to the released position. Thereupon, ground will be provided to the center right-hand armature and contact of relay 52–*a* now in a closed position through the inner left-hand contact of relay 65, and ground extends to the winding of relay 53–*a* and thence to battery. Relay 53–*a* will operate and lock through its inner right contact and armature, through the outer right-hand closed contact and armature of relay 53–*b* to ground.

The current through the left-hand winding of relay 52–*a* has been interrupted by the release of relay 65 previously indicated, breaking the ground connection from the inner left-hand contact and armature of relay 65 through the path previously described to the left-hand winding of relay 52–*a*; but relay 52–*a* is still locked by its right-hand winding.

After a period of time, relay 65 again operates and now a new ground path will be provided through the inner left-hand armature and front contact of relay 65 in the operated condition to the now made inner left-hand armature and contact of relay 53–*a* to the left-hand winding of relay 52–*b* which has its other terminal connected to battery. Relay 52–*b* will operate.

Operation of relay 52–*b* will break the lock path at the outer right-hand armature and contact of relay 52–*b* to relay 52–*a* and allow 52–*a* to release; no current now flows through either winding of relay 52–*a*. Relay 52–*b* locks through its right-hand winding to its inner right-hand contact and armature and through the outer right-hand contact and armature to ground of relay 52–*c* in the manner described for relay 52–*a*. The battery potential offered to the left-hand portions of the seize relays on incoming level 1 is broken by the release of relay 52–*a* and the battery is now supplied to the corresponding seize relays of the second incoming level. This occurs through the closing of the left-hand contact and armature of relay 52–*b*, the remaining path through the second level being identical with that as described for the first level. Similarly, the operation of relay 52–*b* operates relay 53–*b* by applying a ground to its winding and, in turn, relay 53–*b* locks through its inner right-hand contact and armature through the outer right-hand contact and armature of relay 53–*c* to ground. The locking of relay 53–*b* will now unlock relay 53–*a* through the opening of the outer right-hand contact of relay 53–*b*.

To summarize, each of the ring gate relays 52–*a*, 52–*b* and 52–*c* will be successively operated dependent upon the movement of the inner left-hand armature of relay 65 and a battery potential will be offered to the left-hand windings of the seize relays on the several incoming levels in sequence. The operation of relay 52–*a* follows the release of relay 52–*c* and the relay ring will continue through its repetitive cycle. In effect, this will offer an operating connection from each of the incoming levels to all of the outgoing loops successively for the levels. When a particular seize relay associated with the appropriate incoming level and outgoing loop finds its associated preempt relay in operated condition, that seize relays will operate if the line is not busy.

It is well to recall that the stepping pulses occur as a result of the operation of relay 50, and that relay 50 operates solely when one of the preempt relays has been operated by operation of the appropriate operating key. Thus, when all incoming calls have been satisfied and on preparatory condition is to be found at any level, relay 50 will release; the stepping pulses will cease and the relay ring will remain in the position in which it was at the time relay 50 released until a preparatory condition is reestablished.

Additional incoming levels will require additional ring gate and ring control relays similar to relays 52–*a* and 53–*a*, but operation would be otherwise similar.

*Termination of message*

It has been stated that one object of the invention is to provide means whereby the equipment set in motion through the reception of the message will be arrested upon the termination of a message. The following describes the means whereby the central receiving apparatus is stopped upon a reception of a certain predetermined code grouping.

When the sensing pins connected to the sensing armatures 8 receive a given character, the initial step in the termination arrangements may be made. For example, for the character controlling the movement of the receiver printing platen to upper case, known in the art as "Figs.," the sensing armatures may have spacing and marking on their respective contacts in accordance with the following: MMSMM, where M is "mark" and S is "space." Analyzing the effects of such a combination upon the various armatures 8, in Fig. 2, it will be noted that a mark condition would exist on the first and second armatures, a space condition on the third armature, and a mark condition in the fourth and fifth armatures looking downward. The first, second, fourth and fifth armatures would therefore be connected to ground; the third armature would be connected to the battery. Leads running from the first, second, fourth and fifth sensing armatures 8 will connect to resistances 69–*e*, 69–*d*, 69–*b* and 69–*a* respectively. The other ends of these resistances are connected in common to the lower winding of relay 70, and through that winding to battery. The third of the sensing armatures would be connected through the appropriate lead to resistance 69–*c* and to the upper winding of relay 70 and thence to ground. Thus, a voltage will exist across both the upper and lower windings of relay 70 when the five sensing armatures 8 are sensing the character representing "Figs." No combination other than "Figs." will provide sufficient current to operate relay 70; relay 70 is adjusted so that the core flux density resulting from current through the upper and lower windings combined as previously described will overcome the bias spring 71, thus operating only upon the receipt of the "Figs." character. Operation of relay 70 will provide a path from ground to the now closed armature and contact of relay 70 to the right-hand winding of relay 34 through which the path extends to battery; relay 34 will now operate.

Relay 34 will lock through its left-hand winding, contact and armature through the auxiliary contact and armatures 32 and 33 to ground; the auxiliary contacts are closed provided the distributor is stopped. In addition, operation of relay 34 will provide a ground path through its right-hand armature and contact to the right-hand winding of relay 76 through which the path extends to battery; relay 76 will then operate.

Relay 76 has a slow release characteristic; a short-circuit is provided between its inner contact and armature and its left-hand winding. Thus, the opening of the auxiliary contacts 32 and 33 and the subsequent unlocking of relay 34 will not immediately release relay 76, at least until the next character is received.

If the next character received is "H," the sensing pins will convey to the sensing armatures 8 to the code group represented as SSMSM where M is "mark" and S is "space" as before. The code grouping for the "H" will connect the first, second and fourth sensing armatures to battery, and respectively to resistances 68–*e*, 68–*d* and 68–*b*. Each of these resistances is in turn connected in common to the terminal of the lower winding of relay 72 which has its other terminal connected to ground. Similarly, the third and fifth sensing armatures are connected from ground to resistances 68–*c* and 68–*a*; and thence in common to the upper winding of relay 72 which has a connection to battery. As in the case of relay 70, relay 72 will have a maximum current through both its upper and lower windings when the sensing armatures receive the character "H". Any other character than "H" will cause a lesser current to flow through at least one of the windings of relay 72. The bias spring 73 is adjusted to hold the contacts of relay 72 open except when current is at the maximum described. When "H" character is received, relay 72 closes its contacts and a ground path is provided to the right-hand winding of relay 35, which has a connection to battery. Operation of relay 35 will in turn provide a ground path through its right-hand armature and contact through the outer armature and contact of relay 76, the latter still made because of its slow release characteristic, to the winding of relay 74 which now operates.

Operation of relay 74 opens its closed contact and armature, in turn opening the locking circuit path of relay 44. This occurs because the ground path through the No. 1 contact of relay 47 no longer passes through the normally closed contact of relay 74 to the inner left-hand locked contact and armature of relay 44 in the lock path previously described. Thus, operation of relay 74 unlocks relay 44, in turn releasing relay 45-*a*. Relay 45-*a* is of the slow release type, and relay 45-*b* will remain operated for a short period of time because of the slow release of the outer armature of relay 45-*a*. In the meantime, the inner armature of relay 45-*a* has also released and although the make-before-break contact of relay 45-*a* may make with the inner contact of relay 45-*a*, inasmuch as the contact of relay 45-*b* is as yet held open, no ground path remains for the locking circuit to contact 4 of relay 47; relay 47 will release. Subsequently, relay 45-*b*, also slow releasing, will be released as relay 45-*a* releases. In the meantime, the previously locked preempt relay 47 will have been released and the circuit of relays 45-*a* and 45-*b* are in condition to receive another preparatory signal. Release of the preempt relay 47 unlocks the associated seize relay 49, disconnecting the incoming level from the outgoing loop; the lamps 48 and 54 which indicate the preparatory condition and the seizing of the line respectively will be extinguished. Relay 55 in Fig. 3 will release both through the opening of the center left-hand armature and contact of relay 44 and the opening of the No. 2 contact of seize relay 49.

Release of relay 55 will in turn deenergize relay 26. Deenergization of relay 26 will stop the distributor; opening the right-hand contacts of relay 26 removes ground from the start magnet 21, in turn stopping the rotation of the distributor shaft 13. A release switch 75 may also be used to operate relay 74 releasing the line and stopping the transmitter as previously indicated, and the other previously indicated occurrences happening upon release 74 should the operator close release switch 75.

If the reception of the "Figs." character is followed by the reception of a character other than "H," the slow release relay 76 will have time to release and the subsequent reception of the "H" character will not effect the stoppage of the transmitter; the auxiliary contacts 32 and 33 will have broken upon rotation of the distributor, unlocking relay 34, and although a subsequent reception of the "H" character will energize relay 35, the outer contact of relay 76 will be open and relay 74 will not operate.

Ordinarily, the end of a message will be accompanied by a cessation of the operation of the reperforator 12 and as a result, the tape 11 will soon become taut. The taut tape condition will cause armature 28 to break its contact with 28-*a*, removing ground from the winding of relay 23. In turn, the start magnet 21 will be released, stopping the distributor shaft 13 and the tape-stepping mechanism. Thus, the failure of the message to terminate properly in the appropriate "Figs." and "H" characters will still not fail to stop the transmitter and tape-stepping mechanism upon a taut tape condition with respect to the reperforator.

Although the invention has been illustrated as applied to a particular system, it is, of course, obvious that variations may be made without departing from the spirit and scope of the invention.

What is claimed is:

1. A telegraph switching system comprising a plurality of transmitters, a plurality of outgoing loops, means in a group individual to each transmitter and having means individual to each loop for marking said loops for connection to the said transmitters, means activated by any of said marking means and continuing in operation only as long as any of said marking means remains operated to generate repetitive timed pulses, connecting means individual to each of said marking means and responsive to said pulses to a couple selectively said marked loops to said transmitters, and means common to all of said transmitters for distributing said pulses rotationally to said connecting means in groups corresponding to the grouping of the said marking means and simultaneously to all the connecting means comprising any group.

2. In a telegraph switching system, a plurality of transmitters at individual levels, a plurality of outgoing loops, means common to the level of each transmitter and to each loop for marking individually said loops for selective connection to any one of the said transmitters, means activated by any of said marking means and continuing in operation only as long as any of said marking means remains operated to generate repetitive timed pulses, relay means coupled to each of said marking means and responsive to the said timed pulses to couple said marked loops to said transmitters, and means common to all of said transmitters for distributing said pulses rotationally to said relay means in groups corresponding to the individual levels of the said transmitters and simultaneously to all the relay means of the group.

3. In a telegraph switching system, a plurality of transmitters at individual levels, a plurality of outgoing loops, means in common with each of the levels of the transmitters and having means individual to each loop for marking individually said loops for selective connection to any one of the said transmitters, an oscillator, pulsing means responsive to the alternations of the said oscillator, said oscillator being activated by any of the said marking means and remaining in operation only concurrently with any one or more of said marking means, a plurality of connecting relays individual to each of said marking means and controlled by the said pulsing means to seize said marked loops for connection to the said transmitters, and means common to all of said transmitters for distributing the pulses of the said pulsing means sequentially to said connecting relays in groups corresponding to the individual levels of the said transmitters and simultaneously to all the connecting relays of the group.

4. In a telegraphic exchange, a switching system comprising a plurality of incoming levels having occasional intelligence thereon, a plurality of transmitters, each associated with one of the said incoming levels, means to supply said intelligence to the said transmitters, a plurality of outgoing loops, means in a group individual to the transmitter of each incoming level and having means individual to each outgoing loop to preempt said loops for selective connection to any one of the said transmitters supplied with said occasional intelligence, an oscillator activated by any of the said preempting means, pulsing means responsive to the alternating output of the said oscillator, individual connecting relay means coupled to each of said preempting means and controlled by the said pulsing means to seize said preempted loops for association with said transmitters, and means common to all of said transmitters for distributing the pulses of the said pulsing means sequentially to said connecting relays in groups corresponding to the individual levels of the said transmitters and simultaneously to all the connecting relays of the group.

5. In a telegraph switching system, a plurality of incoming levels having intelligence thereon, an equal plurality of transmitters, each associated with one of the said incoming levels, means to supply said intelligence to the said transmitters, a plurality of outgoing loops, a plurality of preempting relays in groups individual to each incoming level, each of said groups having a preempting relay individual to each outgoing loop for preempting said loops for selective connection to any one of the said transmitters supplied with said intelligence, a seizing relay individual to each of the said preempting relays and controlled in part by the said preempting relay, said seizing relays selectively coupling the transmitters to the outgoing loops, a pulse oscillator activated by any of the said preempting relays, a relay ring having a plurality of steps equal to the number of incoming levels, each of the steps of the said relay ring including relay means coupled in common with the said seize relays in groups individual to each incoming level to control in part the said seize relays, and means for sequentially and repetitively energizing the steps of the said relay ring from the pulses of the said pulse oscillator.

6. In a telegraph switching system according to claim 5, wherein the pulse oscillator comprises a thermionic discharge tube having a cathode, grid and anode, a relay coupled in the anode-cathode circuit of the said thermionic discharge tube, means to energize the anode-cathode circuit of the said thermionic discharge tube, and means to interrupt the said anode-cathode current a given period of time after the latter current has reached a predetermined magnitude.

7. In a telegraph switching system according to claim 5, wherein the steps of the said relay ring comprise each a gate relay and a control relay, means to control in part the said seizing relays in accordance with the said gate relays and in groups individual to each incoming level corresponding to the steps of the said relay ring, means to interconnect the control relays of the said relay ring in sequential response to the pulses of the said pulse oscillator, and means to control the said gate relays in accordance with the said control relays.

8. In a telegraph switching system according to claim 5, wherein the said means to supply the said intelligence from the said incoming line to the transmitter comprises reperforation means to derive a tape having perforations in accordance with the said intelligence, and perforation sensing means responsive to the perforations of the said derived tape to provide discrete electrical impulses from the said perforations thereof.

9. A selective telegram switching system for retransmission of message material from individual incoming levels to individual outgoing loops comprising seizing relay means in common with each of the incoming levels and outgoing loops, manually operable preempting means to register each of the said seizing relay means for establishing of a connection between the said incoming levels and outgoing loops, a relay ring having steps associated with the said incoming levels, each of said steps having a gate relay in series with the said preempting means to control the said seizing relays in groups common to the said incoming levels, means to generate stepping impulses, said latter means activated by each of the said preempting means for sequential distribution of the said stepping impulses to the gate relays of the said relay ring, and busy guard means deenergizing all of the said seizing relays in the group common to the busy outgoing loop excepting the first operated seizing relay means.

10. In a selective telegraph switching system according to claim 9, the circuit comprising first relay means responsive to a first predetermined code contained in the said message material to delay transmission of the said message material until the operation of the said preempting means, and second relay means responsive to a second predetermined code contained in the said message material to terminate transmission of the said message material and to restore the said preempting means to a non-operated condition.

11. A selective telegraph switching system for retransmission of message material from individual incoming levels to individual outgoing loops comprising seizing relay means in common with each of the incoming levels and outgoing loops, manually operable preempting means to register each of the said seizing relay means for establishment of a connection between the said incoming levels and outgoing loops, a relay ring having steps associated with the said incoming levels, each of said steps having a gate relay in series with the said preempting means to control the said seizing relays in groups common to the said incoming levels, means to generate stepping impulses, said latter means activated by each of the said preempting means for sequential distribution of the said stepping impulses to the gate relays of the said relay ring, busy guard means deenergizing all of the said seizing relays in the group common to the busy outgoing loop excepting the first operated seizing relay means, and means responsive to the said preempting means to delay transmission of the said message material common to the said deenergized seizing relays.

12. In a telegraph switching system for retransmitting message material including a central receiving station having a plurality of incoming lines and a plurality of outgoing loops, a plurality of sub-receiving stations each associated with the said outgoing loops, a circuit comprising first relay means having discrete segments coupling each of the said incoming lines and outgong loops in common, manually operable second relay means for selectively designating individual segments of the said first relay means for energization, third relay means associated with the segments of the said first relay means in ranks common to each of the said incoming lines, said third relay means energizing the segments of the said first relay means in groups according to the said ranks, an oscillator having a pulsed output, and means to interconnect the ranks of the said third relay means in successive and repetitive operational sequence responsive to the pulsed output of the said oscillator.

13. In a retransmitting telegraph switching system including a central receiving station having a plurality of incoming lines with message material thereon and a plurality of outgoing loops, a plurality of sub-receiving stations coupled to the said outgoing loops, the circuit comprising, discrete connecting relays coupled in common with each of the said incoming lines and outgoing loops, a plurality of preempting relays each associated with one of the said connecting relays designating individual connecting relays to couple the said incoming lines and outgoing loops selectively, manually operable keys for energizing the said preempting relays, a plurality of gate relays associated with the said connecting relays in ranks common to each of the said incoming lines, said gate relays energizing the said connecting relays in groups according to the said ranks, an oscillator energized by any of the said preempting relays and having a pulsed output, and means to energize the said gate relays in a closed operational ring having progressive steps responsive to the said oscillator.

14. In a telegraph switching system, a plurality of incoming levels having intelligence thereon, an equal plurality of transmitters, each associated with one of said incoming levels, means to supply said intelligence to the said transmitters, a pluralty of outgoing loops, a plurality of preempting relays in groups individual to each incoming level, each of said groups having a preempting relay individual to each outgoing loop for preempting said loops for selective connection to any one of the said transmitters supplied with said intelligence, a seizing relay individual to each of the said preempting relays and controlled in part by the said preempting relays, said seizing relays selectively coupling the transmitters to the outgoing loops, a source of pulses activated by any one of the said preempting relays, a relay ring having a plurality of steps equal to the number of incoming levels, each of the steps of the said relay ring including relay means coupled in common with the said seizing relays in groups individual to each incoming level to control in part the said seizing relays, and means for sequentially and repetitively energizing the steps of the said relay ring from said source of pulses.

15. In a telegraph switching system, a plurality of incoming levels having intelligence thereon, an equal plurality of transmitters each associated with one of said incoming levels, means to supply said intelligence to the said transmitters, a plurality of outgoing loops, a plurality of preempting relays in groups individual to each incoming level, each of said groups having a preempting relay individual to each outgoing loop for preempting said loops for selective connection to any one of the said transmitters supplied with said intelligence, a seizing relay individual to each of the said preempting relays and controlled in part by the said preempting relays, said seizing relays selectively coupling the transmitters to the outgoing loops, a source of pulses activated by any of said preempting relays, a commutating circuit having a plurality of steps equal to the number of incoming levels, each of said steps including means coupled in common with the said seizing relays in groups individual to each incoming level to control in part the said seizing relays, and means for sequentially and repetitively energizing the steps of said commutating circuit from the pulses generated by said source of pulses.

References Cited in the file of this patent

UNITED STATES PATENTS

| Number | Name | Date |
|---|---|---|
| 1,749,444 | Rae | Mar. 4, 1930 |
| 2,410,540 | Wight et al. | Nov. 5, 1946 |
| 2,546,627 | Blauton | Mar. 27, 1951 |
| 2,546,630 | Currie | Mar. 27, 1951 |
| 2,632,044 | Light | Mar. 17, 1953 |